(12) United States Patent
Hattori et al.

(10) Patent No.: US 11,258,334 B2
(45) Date of Patent: Feb. 22, 2022

(54) MOTOR

(71) Applicant: Nidec Corporation, Kyoto (JP)

(72) Inventors: Takashi Hattori, Kyoto (JP); Yuichi Nishikawa, Kyoto (JP); Yuki Hamada, Kyoto (JP); Yu Kuwamoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 187 days.

(21) Appl. No.: 16/785,777

(22) Filed: Feb. 10, 2020

(65) Prior Publication Data
US 2020/0313515 A1 Oct. 1, 2020

(30) Foreign Application Priority Data

Mar. 29, 2019 (JP) .............................. JP2019-069004

(51) Int. Cl.
*H02K 9/22* (2006.01)
*H02K 5/22* (2006.01)

(52) U.S. Cl.
CPC ............... *H02K 9/22* (2013.01); *H02K 5/225* (2013.01)

(58) Field of Classification Search
None
See application file for complete search history.

(56) References Cited

U.S. PATENT DOCUMENTS

| | | | |
|---|---|---|---|
| 9,180,906 B2 | 11/2015 | Suga et al. | |
| 9,473,004 B2 * | 10/2016 | Kadoike | ............... H02K 11/33 |
| 10,468,935 B2 * | 11/2019 | Yamashita | ............. H02K 11/33 |
| 2016/0211727 A1 * | 7/2016 | Maier | ..................... H02K 11/33 |
| 2017/0201148 A1 * | 7/2017 | Haga | ........................ H02K 5/225 |
| 2018/0248440 A1 * | 8/2018 | Yamashita | ............... H02K 5/22 |
| 2019/0267862 A1 * | 8/2019 | Hattori | .................... H02K 11/33 |
| 2019/0313549 A1 * | 10/2019 | Fujita | ..................... H02K 11/33 |
| 2019/0363607 A1 * | 11/2019 | Guntermann | ........... F04B 35/04 |
| 2020/0172154 A1 * | 6/2020 | Hattori | ................... H02K 11/33 |
| 2020/0220435 A1 * | 7/2020 | Hattori | .................... B62D 5/0406 |
| 2020/0313494 A1 * | 10/2020 | Hattori | ................... H02K 11/33 |
| 2020/0313503 A1 * | 10/2020 | Hattori | ................... H02K 5/225 |
| 2020/0313515 A1 * | 10/2020 | Hattori | ..................... H02K 5/10 |
| 2020/0366156 A1 * | 11/2020 | Imai | ........................ F16J 15/14 |
| 2020/0366163 A1 * | 11/2020 | Hara | ...................... H02K 7/116 |

\* cited by examiner

*Primary Examiner* — Robert W Horn

(74) *Attorney, Agent, or Firm* — Keating & Bennett

(57) ABSTRACT

A motor includes a motor body, a housing, a heat sink, a controller, a connector, and a cover. The heat sink includes two arm portions each extending radially outward. The connector is held between the two arm portions. The heat sink and the connector include a cover joint portion extending all the way around surfaces of the heat sink and the connector along a circumferential direction, is loop-shaped, and surrounds the controller, when viewed in an axial direction. The cover is joined to the cover joint portion. The connector includes a connector outside surface exposed between the two arm portions, and including circumferential end portions adjacent to the arm portions and overlapping with an imaginary line joining distal ends of the two arm portions or located radially inward of the imaginary line when viewed in the axial direction.

12 Claims, 14 Drawing Sheets

MOTOR

CROSS REFERENCE TO RELATED APPLICATION

The present invention claims priority under 35 U.S.C. § 119 to Japanese Application No. 2019-069004 filed on Mar. 29, 2019, the entire contents of which are hereby incorporated herein by reference.

1. FIELD OF THE INVENTION

The present disclosure relates to a motor.

2. BACKGROUND

In a known motor including a control unit housed in a housing thereof, a heat sink includes a connector holding portion that projects in a radial direction. A connector connected to the control unit is held in a connector insert hole passing through the connector holding portion in a vertical direction.

However, in the above known motor, the connector holding portion surrounds the connector, resulting in an increased radial dimension of the motor. Meanwhile, simply eliminating a portion of the connector holding portion to achieve a reduced size of the motor might result in reduced protection of the connector against an external impact.

SUMMARY

A motor according to an example embodiment of the present disclosure includes a motor body including a stator and a rotor centered on a central axis extending in a vertical direction, a housing to house the motor body, a heat sink located on an upper side of the motor body, a controller located on the heat sink, a connector connected to the controller, and a cover surrounding the controller and the connector from radially outside. The heat sink includes two arm portions each of which is extends radially outward. The connector is held between the two arm portions. The heat sink and the connector include a cover joint portion extending all the way around surfaces of the heat sink and the connector along a circumferential direction, and being in the shape of a loop, surrounding the controller, when viewed in an axial direction. The cover is joined to the cover joint portion. The connector includes a connector outside surface exposed between the two arm portions, and including circumferential end portions adjacent to the arm portions. The circumferential end portions overlap with an imaginary line joining distal ends of the two arm portions or are radially inward of the imaginary line when viewed in the axial direction.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the accompanying drawings.

Figure 1:
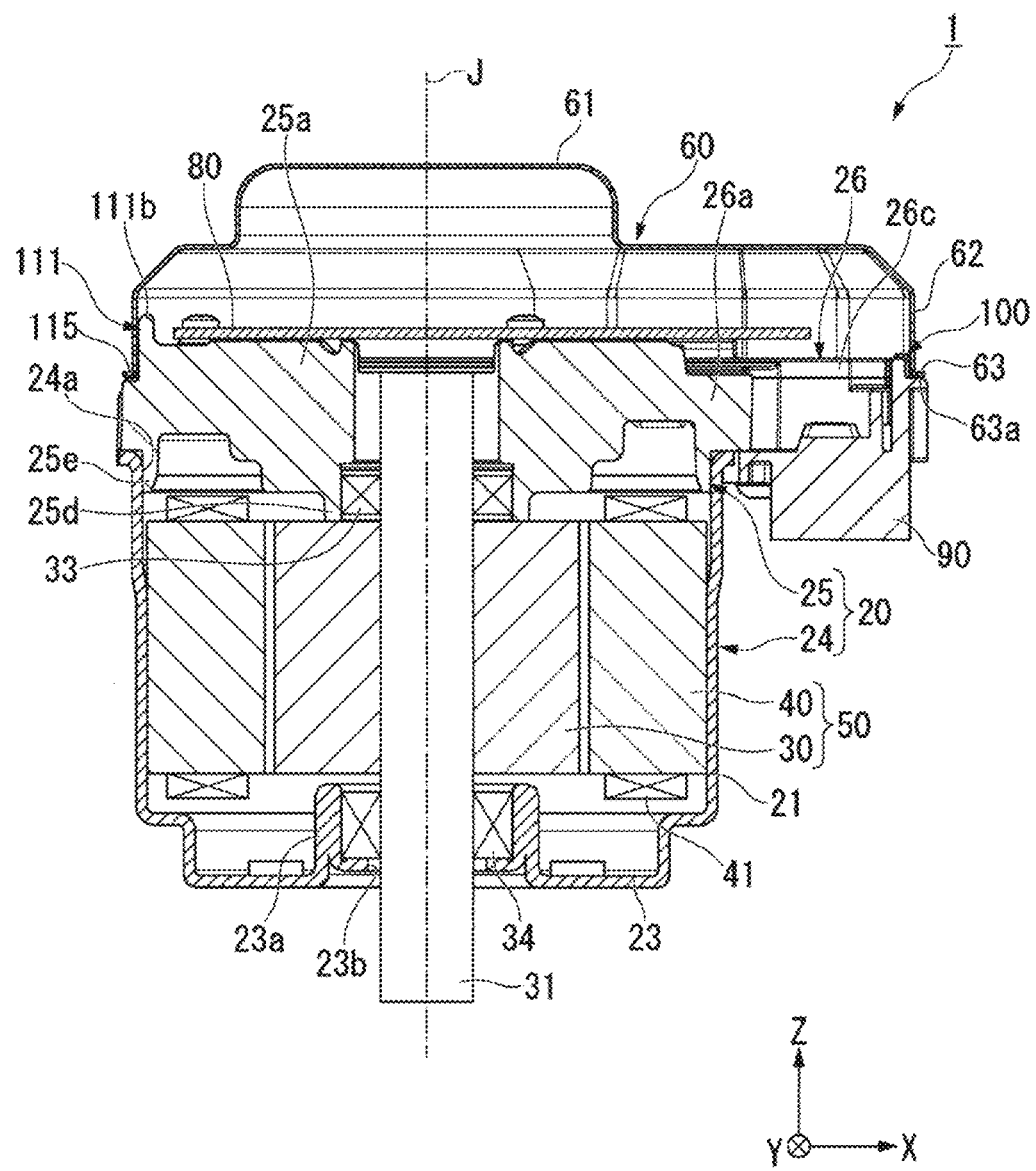
FIG. 1 is a sectional view of a motor according to an example embodiment of the present disclosure.

It is assumed in the following description that a direction parallel to an axial direction of a central axis J in FIG. 1 is a z-axis direction. An x-axis direction is assumed to be a direction perpendicular to the z-axis direction. A y-axis direction is assumed to be a direction perpendicular to both the x-axis direction and the z-axis direction.

A positive side (i.e., a +z side) in the z-axis direction will be referred to as an upper side, while a negative side (i.e., a −z side) in the z-axis direction will be referred to as a lower side. It should be noted, however, that the above definitions of the upper and lower sides are made simply for the sake of convenience in description, and are not meant to restrict actual relative positions or directions of different members or portions. In addition, unless otherwise specified, the direction parallel to the central axis J (i.e., the z-axis direction) will be simply referred to by the term "axial direction", "axial", or "axially", radial directions centered on the central axis J will be simply referred to by the term "radial direction", "radial", or "radially", and a circumferential direction centered on the central axis J, i.e., a circumferential direction about the central axis J, will be simply referred to by the term "circumferential direction", "circumferential", or "circumferentially".

Further, it is assumed herein that directions away from an interior of a housing 20 toward a space outside of the housing 20 and opposite directions on a plane perpendicular to the central axis J will sometimes be simply referred to by the term "radial direction", "radial", or "radially", and that a direction going around the housing 20 on the plane perpendicular to the central axis J will sometimes be simply referred to by the term "circumferential direction", "circumferential", or "circumferentially".

Figure 2:
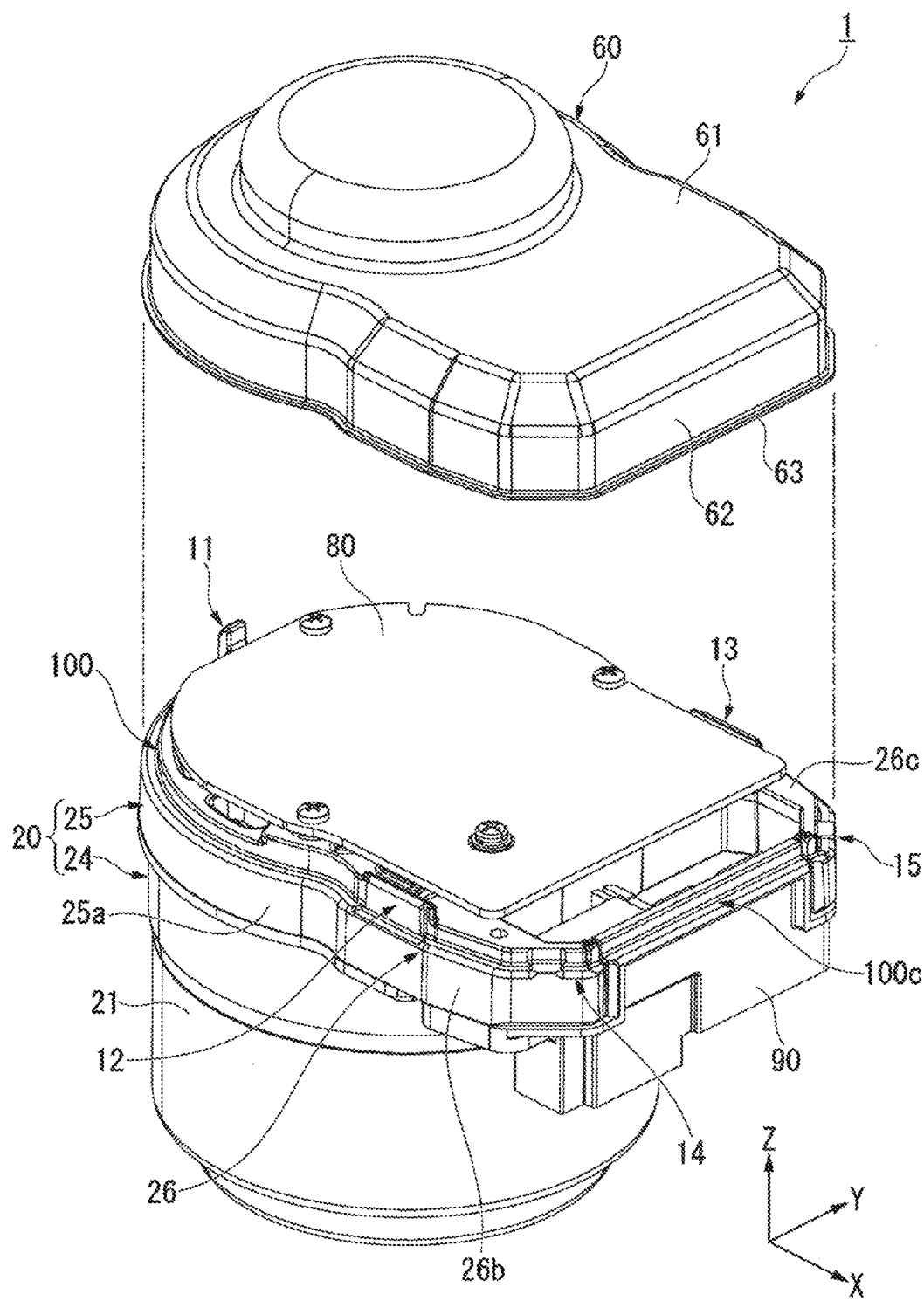
FIG. 2 is a perspective view of the motor according to an example embodiment of the present disclosure.

Referring to FIGS. 1 and 2, a motor 1 according to an example embodiment of the present disclosure includes a housing 20, a motor body 50, an upper-side bearing 33, a lower-side bearing 34, a cover 60, a control portion 80, and a connector 90.

The motor body 50 includes a stator 40 including coils 41, and a rotor 30 arranged to rotate about the central axis J, which extends in a vertical direction. The housing 20 includes a lower housing 24 arranged to house the rotor 30 and the stator 40, and an upper housing 25 located on the upper side of the lower housing 24.

The control portion 80 is arranged on an upper surface of the upper housing 25. In the present example embodiment, the control portion 80 is a control circuit board arranged to extend in directions not parallel to the axial direction. Various types of electronic elements are mounted on the control circuit board as the control portion 80. The control portion 80 is electrically connected to coil wires (not shown) extending from the stator 40. The control portion 80 is electrically connected to connection terminals (not shown) extending from the connector 90.

Figure 13:
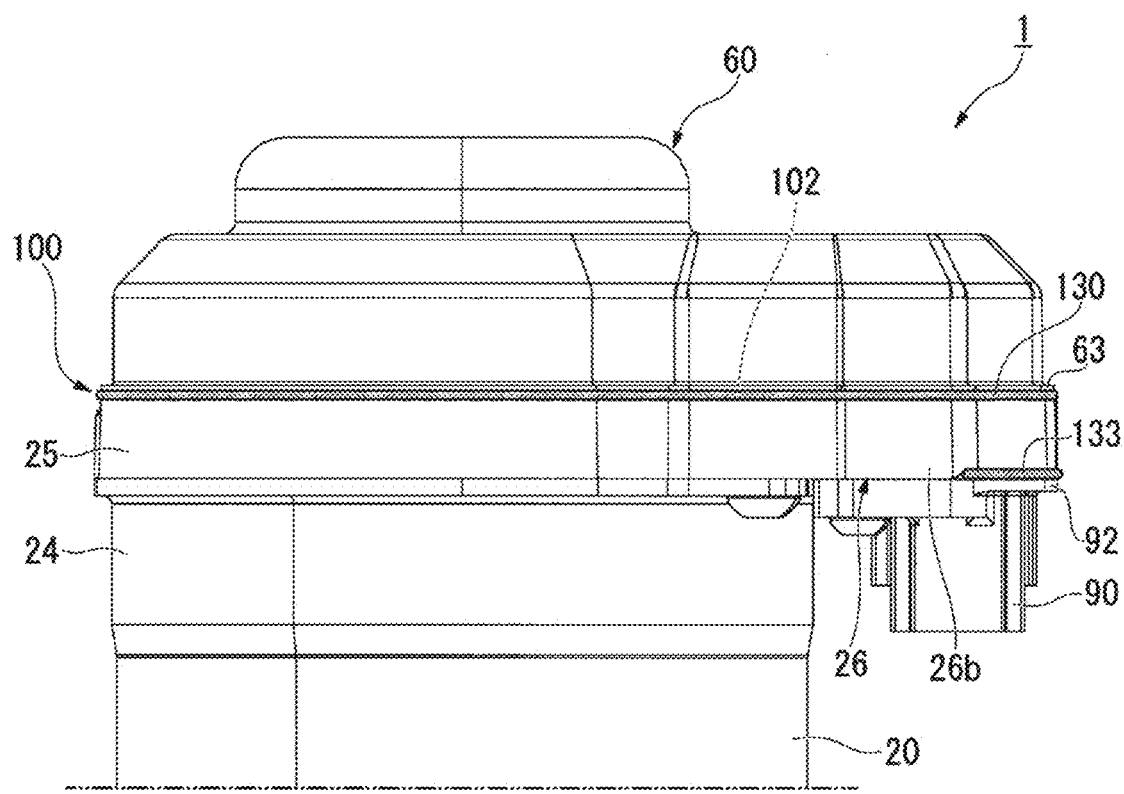
FIG. 13 is a side view of the motor, illustrating regions to which adhesives are applied.

The control portion 80 is surrounded by the cover 60, which is arranged to cover the control portion 80 on the upper side of the upper housing 25 and the connector 90, and the control portion 80 is housed in an interior of the motor 1. The upper housing 25 and the connector 90 include a cover joint portion 100 to which the cover 60 is joined, and the cover joint portion 100 is sealed with an adhesive 130 as a watertight member as illustrated in FIG. 13.

The lower housing 24 includes a tubular portion 21 arranged to extend in the vertical direction, a bottom wall portion 23 located at a lower end of the tubular portion 21, and an opening portion 24a arranged to open upward. The stator 40 is fixed to an inner surface of the housing 20.

In the present example embodiment, the tubular portion 21 is cylindrical, and is centered on the central axis J. The tubular portion 21 may not necessarily be in a cylindrical shape, but may alternatively be, for example, in the shape of a polygonal tube. The bottom wall portion 23 is located on the lower side of the stator 40. The bottom wall portion 23 includes a bearing holding portion 23a arranged to hold the lower-side bearing 34, and an output shaft hole 23b arranged to pass through the bottom wall portion 23 in the axial direction.

The rotor 30 includes a shaft 31. The shaft 31 is centered on the central axis J extending in the vertical direction. The rotor 30 is arranged to rotate about the central axis J together with the shaft 31. A lower end portion of the shaft 31 is arranged to project to the lower side of the housing 20 through the output shaft hole 23b.

The upper-side bearing 33 and the lower-side bearing 34 are arranged to support the shaft 31 such that the shaft 31 is capable of rotating about the central axis J. The lower-side bearing 34 is held by the bearing holding portion 23a on the lower side of the stator 40. The upper-side bearing 33 is held by the upper housing 25 on the upper side of the stator 40.

The stator 40 is located radially outside of the rotor 30. The stator 40 includes the coils 41. An outer peripheral surface of the stator 40 is fixed to an inner peripheral surface of the housing 20.

The upper housing 25 is a metal member made of, for example, aluminum. The upper housing 25 includes a heat sink portion 25a located on the upper side of the lower housing 24, and a connector holding portion 26 arranged to extend radially outward from the heat sink portion 25a.

The heat sink portion 25a is in the shape of a thick plate. The control portion 80 is arranged on an upper surface of the heat sink portion 25a. The control portion 80 is thermally connected to the heat sink portion 25a through a heat transmitting member (not shown). The heat sink portion 25a causes heat transferred from the control portion 80 to be dissipated to cool the control portion 80. That is, the upper housing 25 serves as a heat sink in the motor 1. The heat sink portion 25a includes a cylindrical bearing holding portion 25d arranged to open in a lower surface thereof. The upper-side bearing 33 is held inside of the bearing holding portion 25d.

The heat sink portion 25a includes a tubular portion 25e arranged to project downward from the lower surface thereof. The tubular portion 25e is inserted from the upper side into the opening portion 24a, which faces upward, of the lower housing 24. The heat sink portion 25a and the lower housing 24 are fastened to each other through bolts (not shown).

Figure 3:
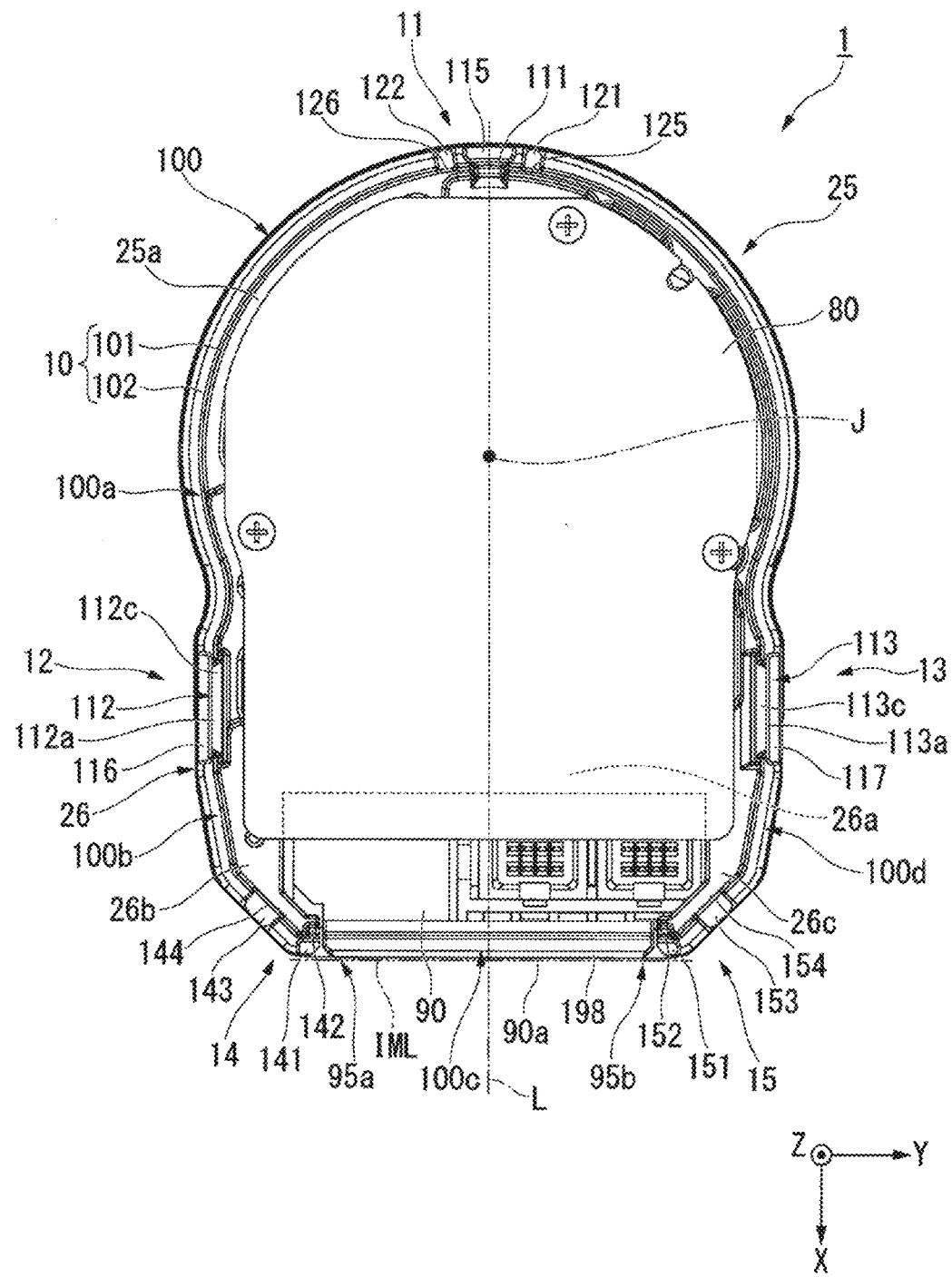
FIG. 3 is a plan view of the motor according to an example embodiment of the present disclosure with a cover removed therefrom.
Figure 4:
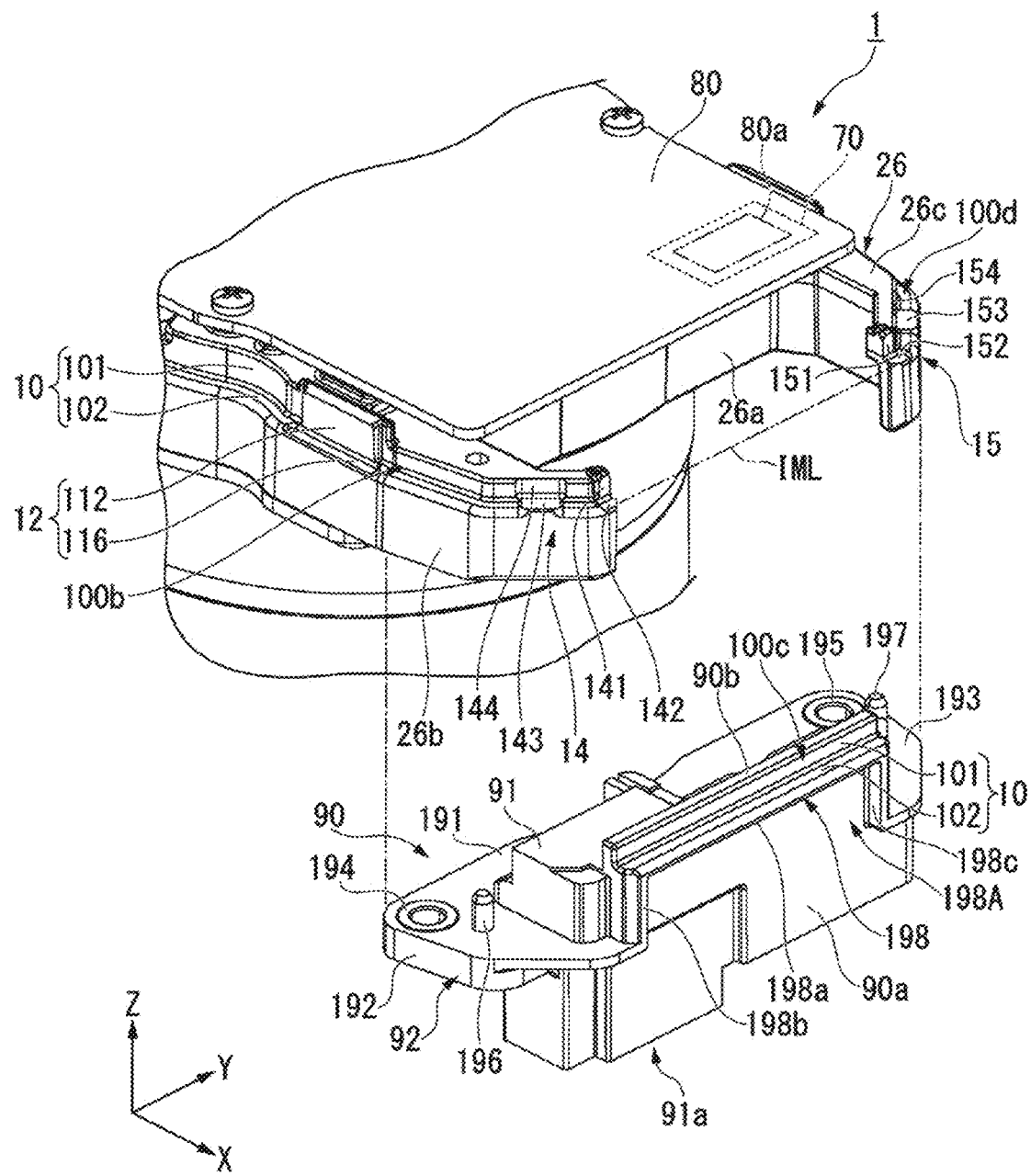
FIG. 4 is a partial perspective view of the motor according to an example embodiment of the present disclosure, illustrating a connector holding portion and a connector.

The connector holding portion 26 is arranged to project radially outward from the heat sink portion 25a to a space radially outward of an outer peripheral surface of the tubular portion 21. As illustrated in FIGS. 3 and 4, the connector holding portion 26 includes a base end portion 26a located radially outside of the heat sink portion 25a in the x-axis direction, and two arm portions 26b and 26c arranged to project radially outward to a +x side from both ends of the base end portion 26a in the y-axis direction.

Figure 5:
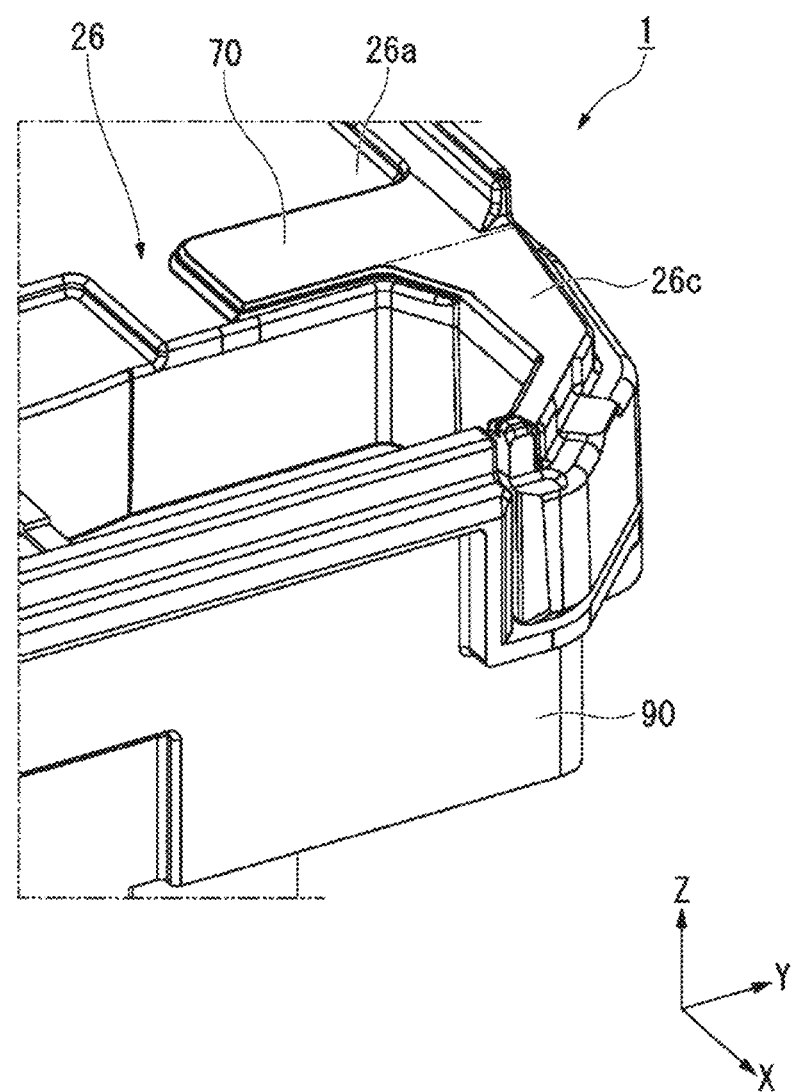
FIG. 5 is a partial perspective view of the motor, illustrating a high-level heat dissipation portion.

Referring to FIGS. 3 and 5, the base end portion 26a is located radially between the connector 90 and the heat sink portion 25a. The base end portion 26a is located on the lower side of the control portion 80. An end portion of the control portion 80 on a side closer to the connector 90 is arranged to extend to the side closer to the connector 90 relative to the base end portion 26a. A portion of the control portion 80 is arranged to overlap with the connector 90 when viewed in the axial direction.

Referring to FIG. 5, the base end portion 26a includes a high-level heat dissipation portion 70 arranged to partially project upward at a junction with the arm portion 26c. The high-level heat dissipation portion 70 in the base end portion 26a is substantially rectangular in the present example embodiment. The high-level heat dissipation portion 70 is located on the lower side of the control portion 80. The high-level heat dissipation portion 70 is arranged to be closer to a lower surface of the control portion 80 than a remaining portion of the base end portion 26a. Therefore, heat tends to be easily transferred from the control portion 80 to the high-level heat dissipation portion 70.

As illustrated in FIG. 4, an electronic element 80a which generates a large amount of heat is arranged on a region of the control portion 80 which overlaps with the high-level heat dissipation portion 70. Heat of the electronic element 80a can be efficiently dissipated when the electronic element 80a, which generates a large amount of heat, is arranged over the high-level heat dissipation portion 70, which is excellent in heat dissipation performance. A thermal grease or a heat transfer sheet may be arranged between the control portion 80 and the high-level heat dissipation portion 70. Any desired number of high-level heat dissipation portions 70 may be arranged at any desired positions on the upper surface of the upper housing 25.

Each of the two arm portions 26b and 26c is arranged to project in a radial direction away from the heat sink portion 25a from a surface of the base end portion 26a which faces away from the heat sink portion 25a. The two arm portions 26b and 26c are arranged apart from each other in a direction (i.e., the y-axis direction) perpendicular to the direction in which each of the arm portions 26b and 26c extends.

Figure 6:
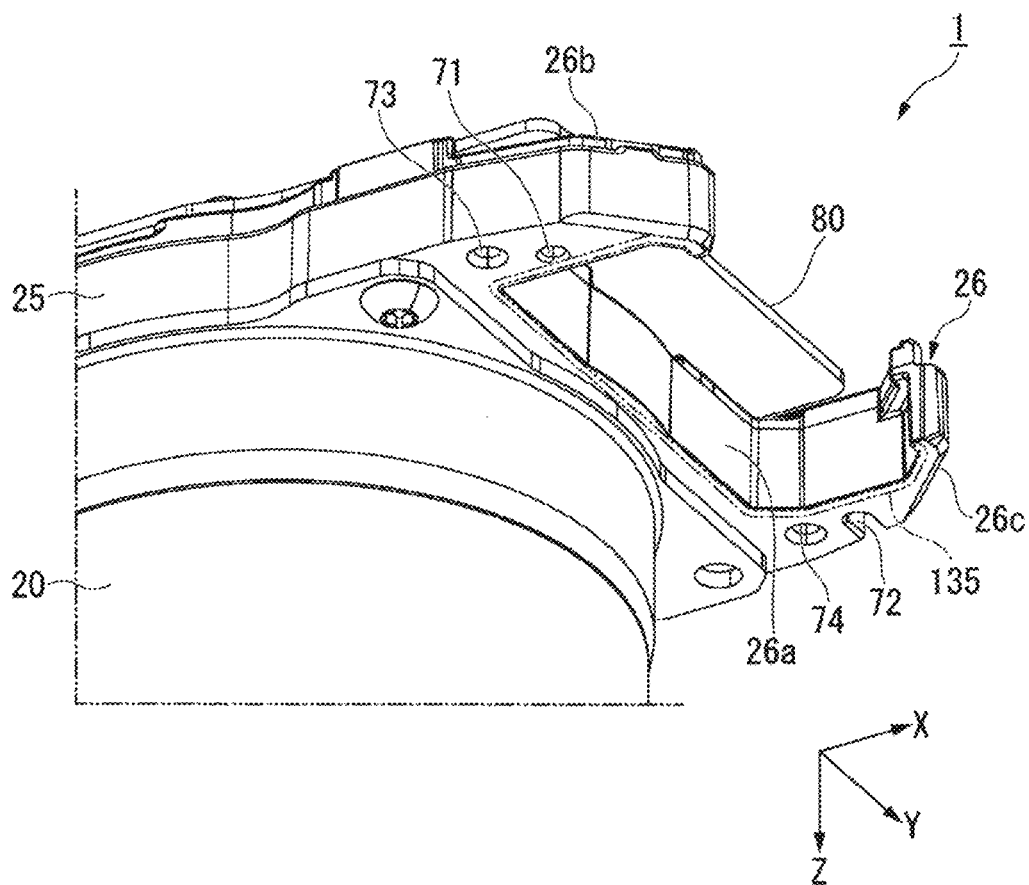
FIG. 6 is a partial perspective view of the motor, illustrating the connector holding portion as viewed obliquely from below.

Referring to FIG. 6, the arm portion 26b includes a recessed positioning portion 71 defined by a hole that opens in a lower surface of the arm portion 26b, and a bolt hole 73 located on a side of the recessed positioning portion 71 closer to the heat sink portion 25a. The arm portion 26c includes a recessed positioning portion 72 defined by a cut that opens in a lower surface and a side surface of the arm portion 26c, and a bolt hole 74 located on a side of the recessed positioning portion 72 closer to the heat sink portion 25a. The two recessed positioning portions 71 and 72 are arranged along the y-axis direction. The two bolt holes 73 and 74 are arranged along the y-axis direction.

The connector 90 is held between the two arm portions 26b and 26c. The connector 90 can thus be fixed in a circumferential direction (or the y-axis direction) through the two arm portions 26b and 26c. In addition, in the case where the upper housing 25, which is a heat sink, is produced by a die-casting process, because each of the arm portions 26b and 26c is arranged to extend substantially in one direction, a mold allows a liquid metal to more smoothly flow therein, and a casting defect is less likely to occur, than in the case where the connector holding portion 26 is molded into the shape of a rectangular frame.

Referring to FIG. 4, the connector 90 includes a connector body 91 arranged to extend in the vertical direction, and a flange portion 92 arranged to extend from a side surface of the connector body 91 in directions not parallel to the vertical direction.

Figure 10:
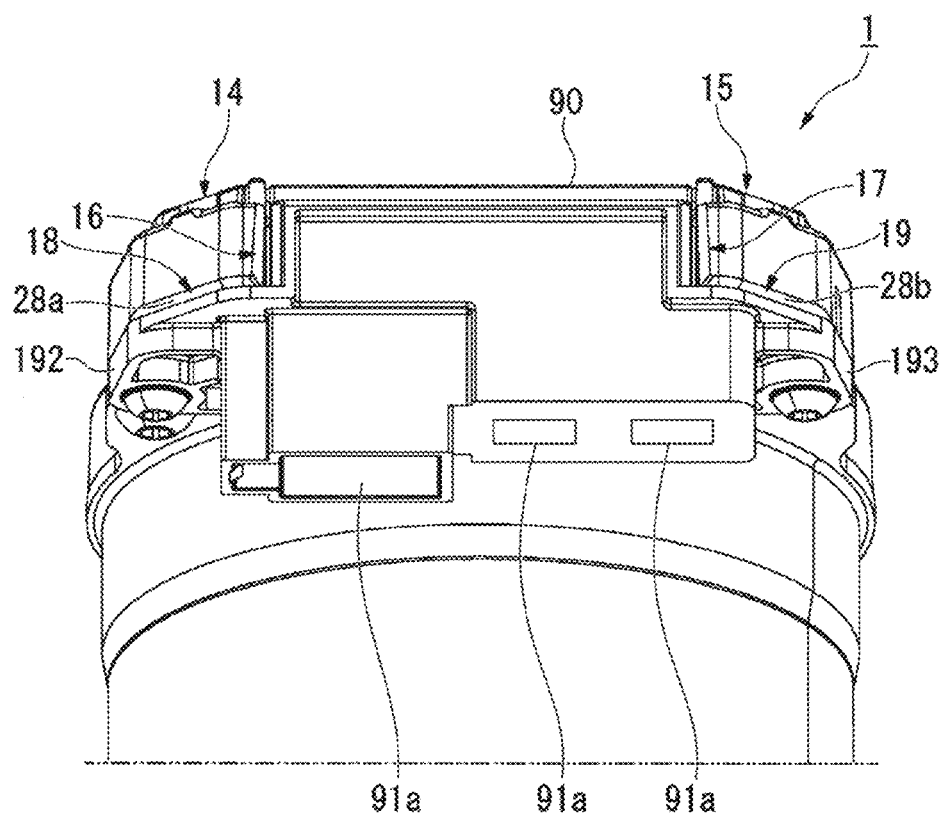
FIG. 10 is a partial perspective view of the motor, illustrating the connector and its vicinity as viewed obliquely from below.

The connector body 91 is a box-shaped member arranged to support the connection terminals (not shown). Referring to FIG. 10, the connector body 91 includes a plurality of recessed portions 91a each of which is arranged to open toward a lower surface thereof. The connection terminals (not shown) are arranged in the recessed portions 91a.

The connector 90 includes a connector outside surface 90a arranged to face radially outward to the +x side. The connector outside surface 90a is located between the arm portions 26b and 26c, and is exposed in an outer peripheral surface of the motor 1. Referring to FIGS. 1 and 3, the connector 90 and the control portion 80 are arranged to overlap in part with each other when viewed from the upper side. The connection terminals (not shown) of the connector 90 are arranged to project upward from an upper surface of the connector body 91. The connector 90 and the control portion 80 are electrically connected to each other through the connection terminals (not shown) at a region where the connector 90 and the control portion 80 overlap with each other.

The connector 90 includes a recessed portion 198A recessed radially inward at the connector outside surface 90a, which is exposed between the two arm portions 26b and 26c.

In the present example embodiment, the connector 90 includes an outside wall portion 198 arranged to extend along an outer edge of the connector outside surface 90a when viewed along the x-axis direction. The outside wall portion 198 includes an upper wall portion 198a arranged to extend along an upper edge of the connector outside surface 90a, a side wall portion 198b arranged to extend along an edge of the connector outside surface 90a on a side closer to the arm portion 26b, and a side wall portion 198c arranged to extend along an edge of the connector outside surface 90a on a side closer to the arm portion 26c. An end portion of the upper wall portion 198a on the side closer to the arm portion 26b is connected to an upper end of the side wall portion 198b. An end portion of the upper wall portion 198a on the side closer to the arm portion 26c is connected to an upper end of the side wall portion 198c.

A region of the connector outside surface 90a which is surrounded by the outside wall portion 198 is located radially inward of the outside wall portion 198. In the present example embodiment, the recessed portion 198A is a recessed portion having the outside wall portion 198 as a side wall, and a region located below the outside wall portion 198 as a bottom surface. The recessed portion 198A, which serves to eliminate a portion of the connector 90, contributes to achieving reductions in size and weight of the motor 1. In addition, the recessed portion 198A reduces the likelihood that an object in an external environment will come into contact with the connector outside surface 90a, which is exposed in an outer surface of the motor 1, to protect the connector 90.

Referring to FIG. 4, the flange portion 92 is arranged to extend horizontally from a portion of an outer peripheral surface of the connector body 91, the portion lying at an intermediate position in the vertical direction. The flange portion 92 includes a first flange 191 arranged to extend from the connector body 91 to a side (i.e., a −x side) on which the base end portion 26a lies, a second flange 192 arranged to extend from the connector body 91 to a side (i.e., a −y side) on which the arm portion 26b lies, and a third flange 193 arranged to extend from the connector body 91 to a side (i.e., a +y side) on which the arm portion 26c lies. That is, the flange portion 92 extends from the side surface of the connector body 91 to both sides in the circumferential direction. Thus, the connector 90 is fixed to the connector holding portion 26 on both sides of the connector body in the circumferential direction (or the y-axis direction). Thus, the connector 90 according to the present example embodiment, which is exposed radially outward, can be stably fixed.

The second flange 192 includes an insert bushing 194 having a through hole arranged to pass through the second flange 192 in the vertical direction. The second flange 192 includes a pin 196 arranged to extend upward from an upper surface of the second flange 192. The pin 196 is located on the −y side of the connector body 91.

The third flange 193 includes an insert bushing 195 having a through hole arranged to pass through the third flange 193 in the vertical direction. The third flange 193 includes a pin 197 arranged to extend upward from an upper surface of the third flange 193. The pin 197 is located on the +y side of the connector body 91.

The connector 90 is inserted into a space between the two arm portions 26b and 26c of the connector holding portion 26 from the lower side. The pin 196 of the second flange 192 is inserted into the recessed positioning portion 71 illustrated in FIG. 6. The pin 197 of the third flange 193 is inserted into the recessed positioning portion 72. The connector 90 is thus positioned with respect to the connector holding portion 26.

Referring to FIG. 6, an adhesive 135 is arranged between the flange portion 92 and the connector holding portion 26. The adhesive 135 is a watertight member that has watertightness after being hardened. The adhesive 135 is arranged to surround the connector body 91 of the connector 90. The adhesive 135 is applied, for example, substantially in the shape of the letter "U" when viewed in the axial direction, along a radially outer edge of the base end portion 26a and inside edges of the arm portions 26b and 26c.

When the connector 90 is arranged on the connector holding portion 26, the connector 90 is inserted through a lower surface of the connector holding portion 26 with the motor 1 being held in an upside-down position. When the adhesive 135 is applied onto the lower surface of the connector holding portion 26 as illustrated in FIG. 6, an operator is able to insert the connector 90 into the connector holding portion 26 while viewing the adhesive 135. Thus, an improvement in workability in assembling the motor 1 is achieved.

Figure 7:
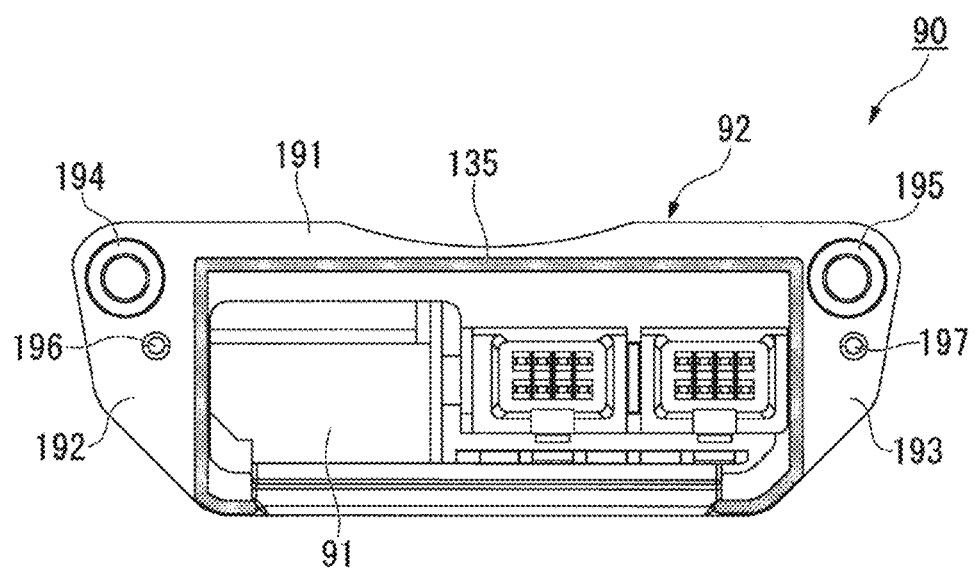
FIG. 7 is a top view of a connector according to an example embodiment of the present disclosure, illustrating a region to which an adhesive is applied.

The adhesive 135 may be applied onto an upper surface of the flange portion 92 as illustrated in FIG. 7. In this case, on the upper surface of the flange portion 92, the adhesive 135 is applied substantially in the shape of the letter "U" to surround the connector body 91 on an outer side.

Notice that the shape of the adhesive 135 illustrated in each of FIGS. 6 and 7 is the shape of the adhesive 135 just applied. The adhesive 135 is spread by the flange portion 92 when the connector 90 is fitted to the connector holding portion 26.

A watertight member other than the adhesive may be arranged between the flange portion 92 and the connector holding portion 26. For example, a gap between the flange portion 92 and the connector holding portion 26 may be sealed using an O ring or a gasket. The use of the adhesive 135 as the watertight member makes the sealing easy even if the upper surface of the flange portion 92 and the lower surface of the connector holding portion 26 have complicated shapes.

The connector 90 is bolted to the connector holding portion 26 with bolts passed through the insert bushings 194 and 195 of the flange portion 92 and screwed into the bolt holes 73 and 74. This bolting spreads the adhesive 135 located between the flange portion 92 and the connector holding portion 26 to seal a large area between opposed surfaces of the flange portion 92 and the connector holding portion 26 with the adhesive 135 as the watertight member.

In the present example embodiment, the flange portion 92 of the connector 90 is located lower than the cover joint portion 100, at which the cover 60 is sealed, and the upper surface of the flange portion 92 is arranged to be in contact with the lower surface of the connector holding portion 26 with the adhesive therebetween. In other words, the upper surface of the flange portion 92 is arranged to be in contact with the lower surface of each of the arm portions 26b and 26c directly or with another member therebetween.

Thus, the flange portion 92 lies lower than the cover joint portion 100, and therefore, water coming from above the motor 1 would be blocked by the cover 60, and would not easily reach the flange portion 92. Thus, water would not easily intrude into a boundary between the flange portion 92 and the connector holding portion 26. In addition, a distance from an outer peripheral end of the flange portion 92 to the side surface of the connector body 91 can be increased by arranging the flange portion 92 to be in contact with the lower surface of the connector holding portion 26. This will lead to an increased length of a path along which water can intrude into the interior of the motor 1, and a reduced likelihood of an intrusion of water.

The upper housing 25 and the connector 90 have the cover joint portion 100 at outer peripheral surfaces of upper end portions thereof. The cover joint portion 100 is arranged to extend in the circumferential direction in outer peripheral surfaces of the upper housing 25 and the connector 90. The cover joint portion 100 is arranged to extend all the way around the outer peripheral surfaces of the upper housing 25 and the connector 90, and is in the shape of a loop, surrounding the control portion 80, when viewed in the axial direction. Referring to FIG. 3, the cover joint portion 100 includes a first portion 100a in the shape of a circular arc and arranged to extend along an outer peripheral surface of the heat sink portion 25a, a second portion 100b in the shape of a broken line and arranged to extend along outer peripheral surfaces of the base end portion 26a of the connector holding portion 26 and the arm portion 26b, a third portion 100c in the shape of a straight line and arranged to extend along the outer peripheral surface of the connector 90, and a fourth portion 100d in the shape of a broken line and arranged to extend along the outer peripheral surface of the base end portion 26a of the connector holding portion 26 and an outer peripheral surface of the arm portion 26c.

The cover joint portion 100 includes a shoulder portion 10 located in the outer peripheral surfaces of the upper housing 25 and the connector 90. The shoulder portion 10 is defined by a first surface 101 arranged to face radially outward and extend along the circumferential direction, and a second surface 102 arranged to face upward and extend radially outward from a lower end of the first surface 101. Each of the first surface 101 and the second surface 102 includes a portion located in the outer peripheral surface of the upper housing 25, and a portion located in the outer peripheral surface of the connector 90.

At the connector 90, the third portion 100c of the cover joint portion 100 is located at an upper end of the connector outside surface 90a. In the third portion 100c, a portion of the first surface 101 is defined by a side surface of an upper wall 90b arranged to extend in a straight line along the y-axis direction, the side surface facing radially outward. The second surface 102 is arranged to extend radially outward from the lower end of the first surface 101. In the third portion 100c, a portion of the second surface 102 is defined by a wall surface located at a radially outer end portion of the connector body 91 and arranged to face upward.

Referring to FIG. 3, in the present example embodiment, the connector outside surface 90a, which is exposed between the two arm portions 26b and 26c, is arranged to overlap with an imaginary line IML that joins distal ends of the two arm portions 26b and 26c when viewed in the axial direction. In more detail, an end surface of the outside wall portion 198 which faces radially outward, the outside wall portion 198 being located at the outer edge of the connector outside surface 90a, is arranged to overlap with the imaginary line IML when viewed in the axial direction. Notice that, in FIG. 3, the imaginary line IML is depicted as being slightly away from the distal ends of the arm portions 26b and 26c radially outward to make it easier to grasp relative positions of the connector outside surface 90a and the imaginary line IML.

According to the present example embodiment, a reduction in a metal member arranged radially outside of the connector 90 can be achieved by arranging the connector 90 to be supported by the two arm portions 26b and 26c, leaving a portion of the connector 90 between the arm portions 26b and 26c exposed. This contributes to reducing the extent to which the connector holding portion 26 projects in a radial direction. This in turn contributes to reducing the size of the upper housing 25, which is the heat sink, and reducing the size of the motor 1.

In addition, because the arm portions 26b and 26c are arranged on both sides of the connector 90 in the circumferential direction, impacts coming in the y-axis direction from outside the arm portions 26b and 26c can be received by the arm portions 26b and 26c, respectively. The connector 90 can thus be protected against such impacts.

In the present example embodiment, the connector outside surface 90a may be entirely located inside of the imaginary line IML. In this case, an effect of protecting the connector 90 through the arm portions 26b and 26c will be further increased.

In the present example embodiment, an end portion of the connector outside surface 90a is arranged to overlap with the imaginary line IML when viewed in the axial direction, but only circumferential end portions 95a and 95b of the connector outside surface 90a, which are arranged adjacent to the arm portions 26b and 26c, respectively, may alternatively be arranged to overlap with the imaginary line IML or be located radially inward of the imaginary line IML. The effect of protecting the connector 90 against an impact can be obtained when at least the circumferential end portions 95a and 95b are arranged to overlap with the imaginary line IML or are located inside of the imaginary line IML.

Figure 8:
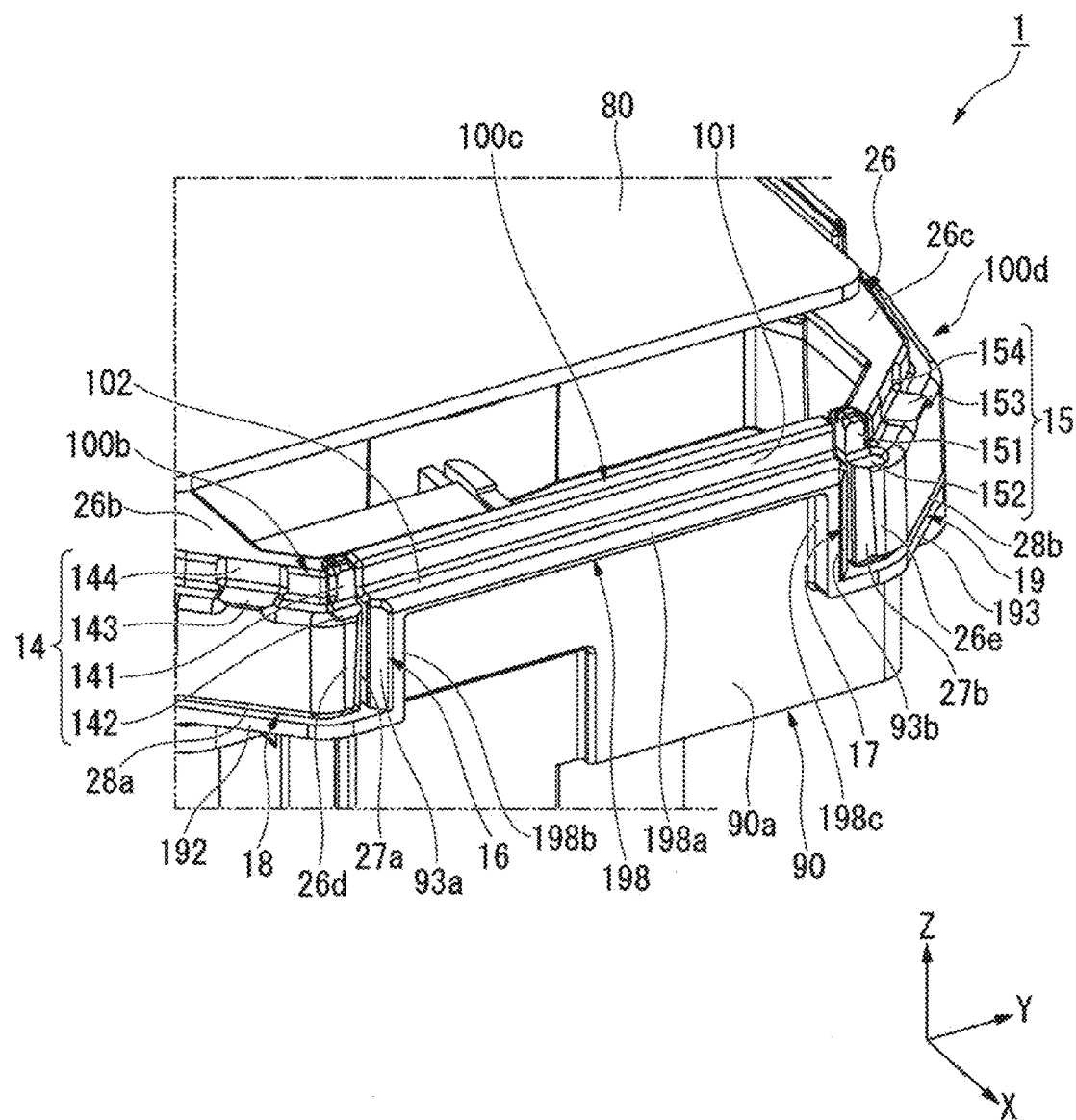
FIG. 8 is a partial perspective view of the motor, illustrating the connector and its vicinity.

Referring to FIG. 8, the two arm portions 26b and 26c include arm distal end surfaces 26d and 26e, respectively, arranged to face radially outward to the +x side, and arranged circumferentially adjacent to the connector outside surface 90a. The motor 1 includes groove portions 16 and 17 at a boundary between the arm distal end surface 26d and the connector outside surface 90a and a boundary between the arm distal end surface 26e and the connector outside surface 90a, respectively. Each of the groove portions 16 and 17 is arranged to extend in the vertical direction along the corresponding boundary. Each of the groove portions 16 and 17 is arranged to open radially outward.

Figure 14:
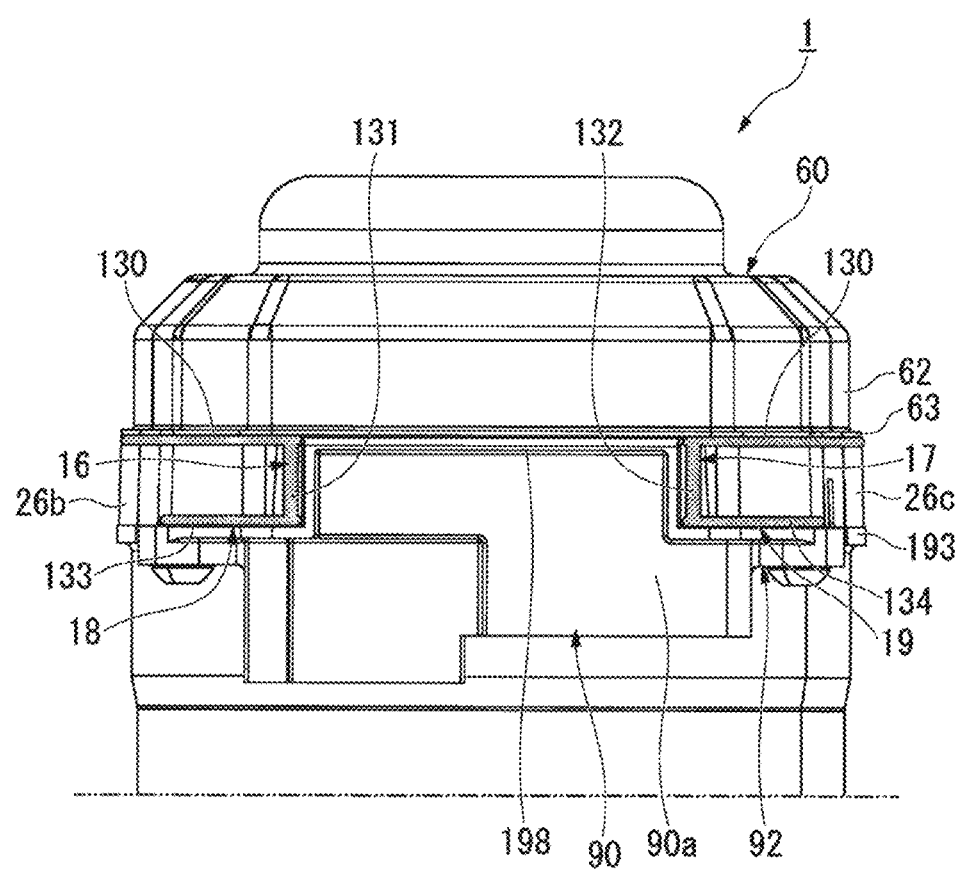
FIG. 14 is a side view of the motor, illustrating regions to which adhesives are applied.

Referring to FIG. 14, in the motor 1, adhesives 131 and 132 are arranged in the groove portions 16 and 17, respectively. That is, each of the groove portions 16 and 17 is sealed with a watertight member. Thus, a boundary between the connector 90 and each of the arm portions 26b and 26c can be satisfactorily sealed. The adhesives 131 and 132 are arranged in the groove portions 16 and 17, respectively, and therefore do not easily protrude out of the groove portions 16 and 17, reducing the likelihood that each of the adhesives 131 and 132 will be adhered to the outer peripheral surface of the motor 1.

In the present example embodiment, the groove portion 16 is a V groove having as side surfaces a slanting portion 27a located at a circumferential end portion of the arm distal end surface 26d and a slanting portion 93a located at a circumferential end portion of the connector outside surface 90a. The slanting portion 27a of the arm portion 26b is located at a corner portion of the arm distal end surface 26d on a side closer to the connector outside surface 90a, and is arranged to slant radially inward while extending toward the connector outside surface 90a. The slanting portion 93a of the connector 90 is located at an end portion of the side wall portion 198b on the side closer to the arm portion 26b. The slanting portion 93a is arranged to extend from a surface of the side wall portion 198b which faces radially outward toward the arm portion 26b while slanting radially inward.

The groove portion 17 is a V groove having as side surfaces a slanting portion 27b located at a circumferential end portion of the arm distal end surface 26e and a slanting portion 93b located at a circumferential end portion of the connector outside surface 90a. The slanting portion 27b of the arm portion 26c is located at a corner portion of the arm distal end surface 26e on a side closer to the connector outside surface 90a, and is arranged to slant radially inward while extending toward the connector outside surface 90a. The slanting portion 93b of the connector 90 is located at an end portion of the side wall portion 198c on the side closer to the arm portion 26c. The slanting portion 93b is arranged to extend from a surface of the side wall portion 198c which faces radially outward toward the arm portion 26c while slanting radially inward.

Having the above-described structure, each of the groove portions 16 and 17 is arranged to become narrower toward a radially inner end, i.e., toward a bottom thereof, and this makes it easier for the adhesives 131 and 132 applied to the groove portions 16 and 17, respectively, to travel deeper toward the bottoms of the groove portions 16 and 17, respectively. The adhesives 131 and 132 are thus spread throughout the groove portions 16 and 17, respectively, to improve sealing of the boundary between the connector 90 and each of the arm portions 26b and 26c.

In the present example embodiment, a lower end portion of the groove portion 16 lies on the upper surface of the second flange 192. In addition, a lower end portion of the groove portion 17 lies on the upper surface of the third flange 193. That is, the lower end portion of each of the groove portions 16 and 17 lies on the upper surface of the flange portion 92. Thus, even if the adhesives 131 and 132 applied to the groove portions 16 and 17, respectively, flow downward, the adhesives 131 and 132 will be stopped by the upper surface of the flange portion 92. This contributes to preventing the adhesives 131 and 132 from protruding out of the groove portions 16 and 17, respectively, to be adhered to the connector 90.

In the present example embodiment, an upper end of each of the groove portions 16 and 17 is connected to the cover joint portion 100. As illustrated in FIG. 14, each of the adhesives 131 and 132 applied to the groove portions 16 and 17, respectively, is connected to the adhesive 130 arranged to adhere the cover joint portion 100 and a tubular portion 62 of the cover 60 to each other. Thus, the adhesive 130 is continuous with each of the adhesives 131 and 132, resulting in improved sealing of the motor 1.

Figure 9:
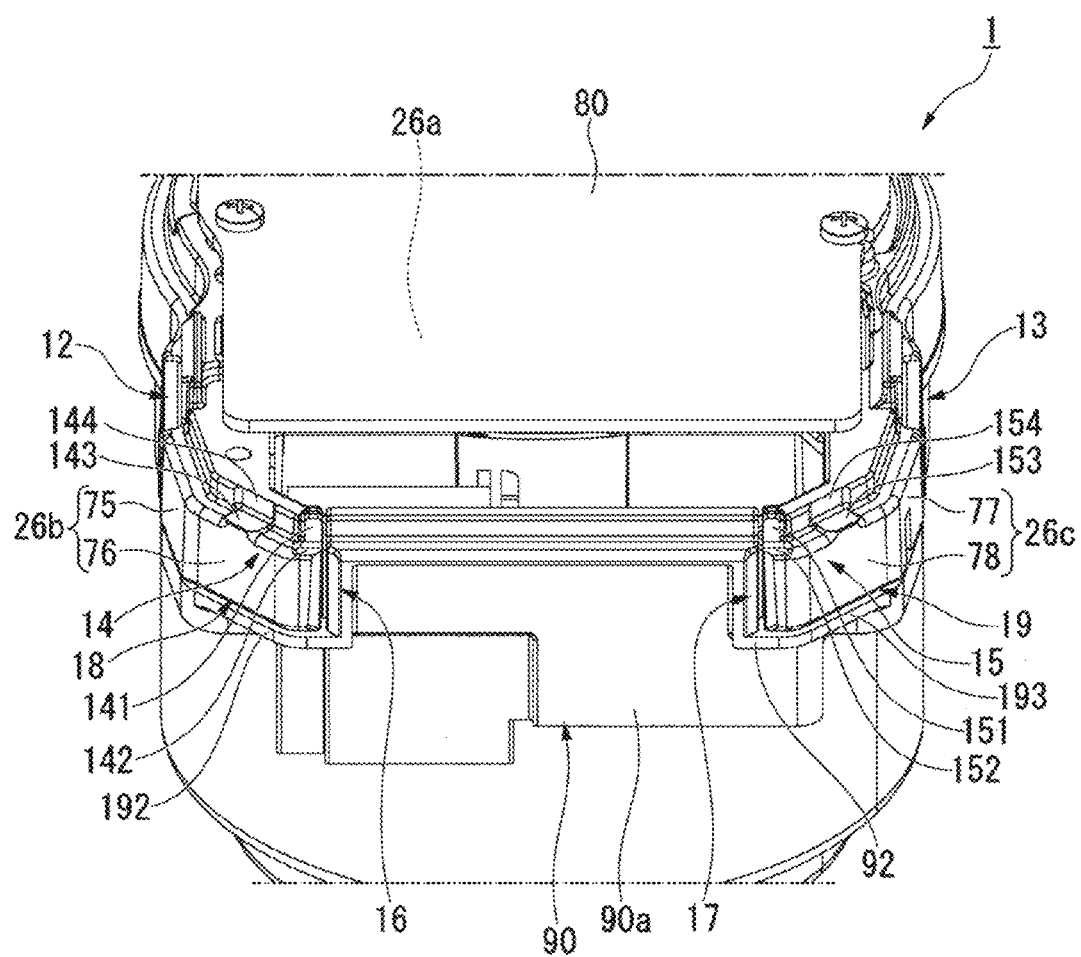
FIG. 9 is a partial perspective view of the motor, illustrating the connector and its vicinity as viewed obliquely from above.

Referring to FIGS. 8, 9, and 10, the motor 1 includes a groove portion 18 arranged to open radially outwardly of the motor 1 between the arm portion 26b and the upper surface of the second flange 192. The arm portion 26b includes, at a lower end portion of a side surface thereof which faces radially outward, a slanting surface 28a arranged to slant radially inward while extending downward. The groove portion 18 is a V groove having the slanting surface 28a and the upper surface of the second flange 192 as side surfaces. An end portion of the groove portion 18 on the side closer to the connector outside surface 90a is connected to a lower end of the groove portion 16.

The motor 1 includes a groove portion 19 arranged to open radially outwardly of the motor 1 between the arm portion 26c and the upper surface of the third flange 193. The arm portion 26c includes, at a lower end portion of a side surface thereof which faces radially outward, a slanting surface 28b arranged to slant radially inward while extending downward. The groove portion 19 is a V groove having the slanting surface 28b and the upper surface of the third flange 193 as side surfaces. An end portion of the groove portion 19 on the side closer to the connector outside surface 90a is connected to a lower end of the groove portion 17.

Referring to FIGS. 13 and 14, in the motor 1, adhesives 133 and 134 are arranged in the groove portions 18 and 19, respectively. That is, each of the groove portions 18 and 19 is sealed with a watertight member. Thus, a boundary between the flange portion 92 of the connector 90 and each of the arm portions 26b and 26c can be satisfactorily sealed. The adhesives 133 and 134 are arranged in the groove portions 18 and 19, respectively, and therefore do not easily protrude out of the groove portions 18 and 19, reducing the likelihood that each of the adhesives 133 and 134 will be adhered to the outer peripheral surface of the motor 1.

The adhesive 133 arranged in the groove portion 18 is connected to the adhesive 131 arranged in the groove portion 16. The adhesive 134 arranged in the groove portion 19 is connected to the adhesive 132 arranged in the groove portion 17. Thus, the adhesives 131 and 133 are continuous with each other, and the adhesives 132 and 134 are continuous with each other, resulting in improved sealing of the boundary between the connector 90 and each of the arm portions 26b and 26c. In addition, the adhesives 131 and 133 can be continuously applied to the groove portions 16 and 18, respectively, and the adhesives 132 and 134 can be continuously applied to the groove portions 17 and 19, respectively, which leads to increased efficiency of a process of applying the adhesives 131 to 134.

The cover joint portion 100 includes a first positioning portion 11, a second positioning portion 12, a third positioning portion 13, a fourth positioning portion 14, and a fifth positioning portion 15.

The first positioning portion 11 is located on an opposite side of the central axis J with respect to the connector 90 when viewed from the upper side. The first positioning portion 11 is located in a circumferential middle of the first portion 100a of the cover joint portion 100. The first positioning portion 11 is located at an end portion of the upper housing 25 on the −x side. The cover joint portion 100 is arranged to be symmetrical in shape with respect to a reference line L extending in the x-axis direction and passing through the first positioning portion 11 and the central axis J.

Figure 11:
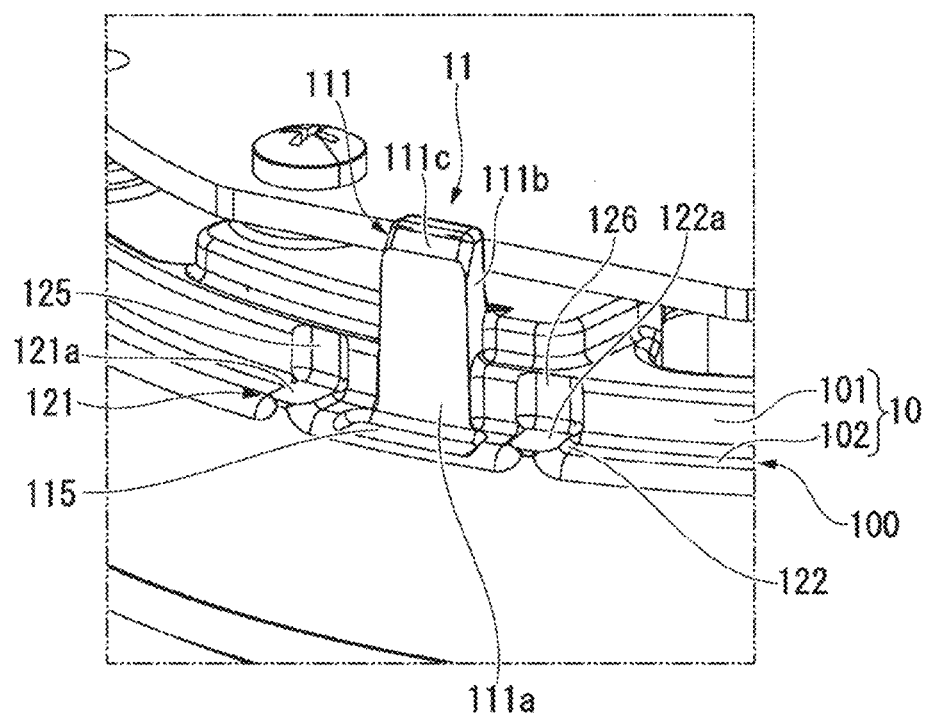
FIG. 11 is a partial perspective view of the motor, illustrating a first positioning portion.

Referring to FIGS. 3 and 11, the first positioning portion 11 includes a first wall portion 111, a first recessed portion 115, second wall portions 121 and 122, and second recessed portions 125 and 126.

The first wall portion 111 includes a wall surface 111a arranged to project radially outward from the first surface 101. The wall surface 111a is a surface facing the −x side. The first wall portion 111 includes a guide projection portion 111b arranged to project upward relative to the first surface 101. That is, the cover joint portion 100 includes the guide projection portion 111b. The wall surface 111a is arranged to extend upwardly of the first surface 101. Referring to FIG. 1, an upper end of the guide projection portion 111b is located higher than an upper surface of the control portion 80. Referring to FIG. 11, the first wall portion 111 includes, at an upper end of the guide projection portion 111b, a slanting portion 111c arranged to slant downward while extending radially outward.

The first recessed portion 115 is located on the lower side of the first wall portion 111. The first recessed portion 115 is a recessed portion arranged to open upward and radially outward. The first recessed portion 115 may alternatively be a recessed portion arranged to open only upward. The first recessed portion 115 is arranged to have a circumferential width greater than a circumferential width of the wall surface 111a of the first wall portion 111.

The second wall portions 121 and 122 are located on both circumferential sides of the first recessed portion 115. The second wall portions 121 and 122 include wall surfaces 121a and 122a, respectively, each of which is arranged to project upward from the second surface 102. A portion of the second surface 102 is arranged between the second wall portion 121 and the first recessed portion 115 and between the second wall portion 122 and the first recessed portion 115. That is, each of the second wall portions 121 and 122 is arranged circumferentially adjacent to the first recessed portion 115 with a portion of the second surface 102 therebetween.

The second recessed portions 125 and 126 are recessed radially inward from the first surface 101 radially inside of the second wall portions 121 and 122, respectively. Each of the second recessed portions 125 and 126 is a recessed portion arranged to open radially outward and upward. Each of the second recessed portions 125 and 126 may alternatively be a recessed portion arranged to open only radially outward. The second recessed portion 125 is arranged to have a circumferential width greater than a circumferential width of the wall surface 121a. The second recessed portion 126 is arranged to have a circumferential width greater than a circumferential width of the wall surface 122a.

The second recessed portions 125 and 126 are located on both circumferential sides of the first wall portion 111. A portion of the first surface 101 is arranged between the first wall portion 111 and each of the second recessed portions 125 and 126. That is, each of the second recessed portions 125 and 126 is arranged circumferentially adjacent to the first wall portion 111 with a portion of the first surface 101 therebetween.

Referring to FIG. 3, the second positioning portion 12 and the third positioning portion 13 are located in the second portion 100b and the fourth portion 100d, respectively, of the cover joint portion 100. The second positioning portion 12 is located in a side portion of the second portion 100b which extends along the x-axis direction. The third positioning portion 13 is located in a side portion of the fourth portion 100d which extends along the x-axis direction. The second positioning portion 12 and the third positioning portion 13 are arranged to be symmetrical in position with respect to the reference line L when viewed from the upper side.

Figure 12:
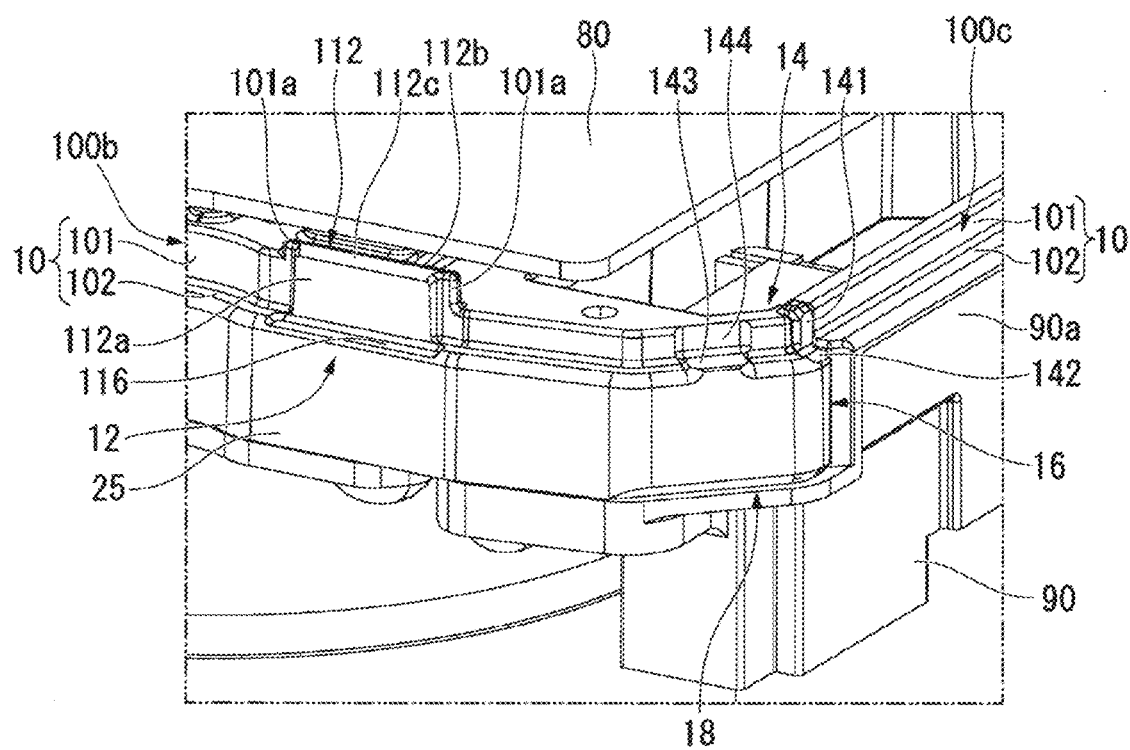
FIG. 12 is a partial perspective view of the motor, illustrating a second positioning portion and a fourth positioning portion.

Referring to FIGS. 3 and 12, the second positioning portion 12 includes a first wall portion 112 and a first recessed portion 116. The first wall portion 112 includes a wall surface 112a arranged to project radially outward from the first surface 101. The wall surface 112a is a surface arranged to face the −y side.

The first wall portion 112 includes a projection portion 112b arranged to project upward relative to the first surface 101. An upper end of the projection portion 112b is located lower than the upper surface of the control portion 80. In the present example embodiment, the upper end of the projection portion 112b is located at substantially the same level as that of the lower surface of the control portion 80. The wall surface 112a is arranged to extend upwardly of the first surface 101. The first wall portion 112 includes, at an upper end of the first wall portion 112, a slanting portion 112c arranged to slant downward while extending radially outward.

The second positioning portion 12 includes two upper projecting portions 101a each of which is arranged to extend laterally from a side surface of the projection portion 112b which faces in the circumferential direction. That is, each upper projecting portion 101a is arranged circumferentially adjacent to the first wall portion 112, which is arranged to be in contact with the cover 60.

Each upper projecting portion 101a is located above the first surface 101. A surface of the upper projecting portion 101a which faces radially outward is continuous with the first surface 101. That is, the upper projecting portion 101a is located radially inward of the first wall portion 112. The upper projecting portion 101a is arranged radially opposite to an inner peripheral surface 62a of the tubular portion 62 with a gap therebetween. In the motor 1, the upper projecting portions 101a arranged on lateral sides of the first wall portion 112 contribute to preventing a particle that may be generated by rubbing of the cover 60 against the first wall portion 112 from coming in toward the control portion 80.

The first recessed portion 116 is located on the lower side of the first wall portion 112. The first recessed portion 116 is a recessed portion arranged to open upward and radially outward. The first recessed portion 116 may alternatively be a recessed portion arranged to open only upward. The first recessed portion 116 is arranged to have a circumferential width greater than a circumferential width of the wall surface 112a of the first wall portion 112.

Referring to FIG. 3, the third positioning portion 13 includes a first wall portion 113 and a first recessed portion 117. The first wall portion 113 and the first recessed portion 117 are arranged to be symmetrical in shape and position to the first wall portion 112 and the first recessed portion 116, respectively, of the second positioning portion 12 with respect to the reference line L as a symmetry axis. That is, the second positioning portion 12 and the third positioning portion 13 are arranged to have line symmetry. Referring to FIG. 3, the first wall portion 113 includes a wall surface 113a arranged to face radially outward, and a slanting portion 113c arranged to slant downward while extending radially outward at an upper end of the first wall portion 113.

The fourth positioning portion 14 is located at a distal end portion of the arm portion 26b. The fourth positioning portion 14 includes a first wall portion 141, a first recessed portion 142, a second wall portion 143, and a second recessed portion 144.

The first wall portion 141 is arranged to project from the first surface 101 radially outward to the +x side at the distal end portion of the arm portion 26b. The first recessed portion 142 is located on the lower side of the first wall portion 141. The first recessed portion 142 is recessed downward from the second surface 102.

The second wall portion 143 is located circumferentially between the first recessed portion 142 and the first recessed portion 116 of the second positioning portion 12. The second wall portion 143 is arranged to project upward from the second surface 102. The second recessed portion 144 is located radially inside of the second wall portion 143. The second recessed portion 144 is recessed radially inward from the first surface 101. The second recessed portion 144 is located circumferentially between the first wall portion 141 and the first wall portion 112.

The fifth positioning portion 15 is located at a distal end portion of the arm portion 26c. The fifth positioning portion 15 includes a first wall portion 151, a first recessed portion 152, a second wall portion 153, and a second recessed portion 154.

The first wall portion 151 is arranged to project from the first surface 101 radially outward to the +x side at the distal end portion of the arm portion 26c. The first recessed portion 152 is located on the lower side of the first wall portion 151. The first recessed portion 152 is recessed downward from the second surface 102.

The second wall portion 153 is located circumferentially between the first recessed portion 152 and the first recessed portion 117 of the third positioning portion 13. The second wall portion 153 is arranged to project upward from the second surface 102. The second recessed portion 154 is located radially inside of the second wall portion 153. The second recessed portion 154 is recessed radially inward from the first surface 101. The second recessed portion 154 is located circumferentially between the first wall portion 151 and the first wall portion 113.

Referring to FIG. 8, in the present example embodiment, each of the first wall portions 141 and 151 located at the arm portions 26b and 26c, respectively, is arranged to project radially outward relative to a portion of the first surface 101 which is included in the connector 90. In addition, the arm portions 26b and 26c include, on the lower side of the first wall portions 141 and 151, respectively, the first recessed portions 142 and 152, respectively, which are recessed downward relative to portions of the second surface 102 which are included in the arm portions 26b and 26c, respectively.

Thus, the tubular portion of the cover 60 can be positioned in the x-axis direction through the first wall portions 141 and 151 located on both circumferential sides of the connector 90. In addition, because excesses of the adhesive 130 on the first wall portions 141 and 151 are able to escape to the first recessed portions 142 and 152, respectively, only an appropriate amount of the adhesive 130 is arranged on each of the first wall portions 141 and 151, and each of the first wall portions 141 and 151 is properly spaced from the tubular portion 62. This leads to a uniform interspace between the first surface 101 and the tubular portion 62 at a portion of the cover joint portion 100 which is included in the connector 90. Thus, the connector 90 and the cover 60 can be adhered to each other with satisfactory sealing. In addition, a reduction in the likelihood that the adhesive 130 will protrude onto the outer peripheral surface of the motor 1 can be achieved.

Referring to FIG. 8, in the present example embodiment, a portion of the cover joint portion 100 which is located in the arm portion 26b includes the second wall portion 143, which projects upward relative to the portion of the second surface 102 which is included in the arm portion 26b, and the second recessed portion 144, which is located radially inside of the second wall portion 143 and is recessed radially inward relative to a portion of the first surface 101 which is included in the arm portion 26b.

A portion of the cover joint portion 100 which is located in the arm portion 26c includes the second wall portion 153, which projects upward relative to the portion of the second surface 102 which is included in the arm portion 26c, and the second recessed portion 154, which is located radially inside of the second wall portion 153 and is recessed radially inward relative to a portion of the first surface 101 which is included in the arm portion 26c.

Thus, the cover 60 and the upper housing 25 are positioned in the axial direction in the vicinity of the connector 90, leading to a uniform interspace between the second surface 102 and a flange portion 63 at the portion of the cover joint portion 100 which is included in the connector 90. Thus, the connector 90 and the cover 60 can be adhered to each other with satisfactory sealing. In addition, a reduction in the likelihood that the adhesive 130 will protrude onto the outer peripheral surface of the motor 1 can be achieved.

Referring to FIG. 9, in the present example embodiment, the arm portion 26b includes an upper arm portion 75 arranged to extend in a radial direction along a side surface of the connector 90, and a forearm portion 76 arranged to extend from a distal end of the upper arm portion 75 to a position radially outside of the connector 90. The first wall portion 141 and the first recessed portion 142 of the arm portion 26b are located in the forearm portion 76.

The arm portion 26c includes an upper arm portion 77 arranged to extend in a radial direction along a side surface of the connector 90, and a forearm portion 78 arranged to extend from a distal end of the upper arm portion 77 to a position radially outside of the connector 90. The first wall portion 151 and the first recessed portion 152 of the arm portion 26c are located in the forearm portion 78.

Thus, with bending of each of the arm portions 26b and 26c of the motor 1, a radially outer surface of the connector 90 can be held in a radial direction by each of the forearm portions 76 and 78. In addition, arranging the first wall portions 141 and 151 in the forearm portions 76 and 78, respectively, which are located radially outside of the connector 90, makes it easier to accurately position an interspace between the portion of the first surface 101 which is included in the connector 90 and the inner peripheral surface 62a of the tubular portion 62.

In the present example embodiment, the second wall portion 143 and the second recessed portion 144 of the arm portion 26b are located in the forearm portion 76. The second wall portion 153 and the second recessed portion 154 of the arm portion 26c are located in the forearm portion 78. Arranging the second wall portions 143 and 153 in the forearm portions 76 and 78, respectively, which are located in the vicinity of the portion of the cover joint portion 100 which is included in the connector 90, makes it easier to accurately position an interspace between the flange portion 63 and a portion of the second surface 102 which is included in the connector 90.

In the present example embodiment, a portion of the cover joint portion 100 which is located in the upper housing 25, which is the heat sink, includes the first wall portions 111 to 113, each of which is arranged to project radially outward from the first surface 101 to be in contact with the inner peripheral surface 62a of the tubular portion 62; the first recessed portions 115 to 117, which are recessed downward from the second surface 102 on the lower side of the first wall portions 111 to 113, respectively; the second wall portions 121 and 122, each of which is arranged to project upward from the second surface 102 to be in contact with a lower surface 63a, which is a downwardly-facing end surface of the tubular portion 62; and the second recessed portions 125 and 126, which are recessed radially inward from the first surface 101 radially inside of the second wall portions 121 and 122, respectively. Thus, the cover 60 and the upper housing 25 can be positioned radially and axially at the portion of the cover joint portion 100 which is located in the upper housing 25 as well. This allows each of an interspace between the first surface 101 and the inner peripheral surface 62a of the tubular portion 62 and an interspace between the second surface 102 and the lower surface 63a of the flange portion 63 to be uniform throughout the entire circumferential extent thereof. The thickness of the adhesive 130 is thus made uniform, resulting in satisfactory adhesion and sealing.

The cover 60 is arranged to cover the upper housing 25 from the upper side. The cover 60 is arranged to house the control portion 80 between the upper housing 25 and the cover 60. The cover 60 includes a top plate portion 61 arranged opposite to the control portion 80 in the vertical direction, and the tubular portion 62, which is arranged to extend downward from an outer peripheral end of the top plate portion 61. The tubular portion 62 of the cover 60 is arranged to surround the control portion 80 from radially outside. The tubular portion 62 includes the flange portion 63, which is arranged to extend radially outward from a lower end of the tubular portion 62.

Referring to FIG. 13, with the cover 60 being positioned at a specific position through the first to fifth positioning portions 11 to 15, the cover 60 is adhered to the cover joint portion 100 through the adhesive 130.

A joint between the cover 60 and the upper housing 25 will now be described in detail below together with a process of fitting the cover 60. Note that the process of fitting the cover as described below is merely an example, and that another fitting method may alternatively be adopted. For example, the adhesive 130 may be applied to other positions.

In the process of fitting the cover 60, the adhesive 130 is first applied to the first surface 101 of the shoulder portion 10 and the first wall portions 111, 112, 113, 141, and 151. In other words, the adhesive 130 is applied to a loop-shaped area of a surface of the cover joint portion 100 which faces radially outward, the loop-shaped area extending in the circumferential direction all the way along the above surface.

In the above process of applying the adhesive 130, the adhesives 131 to 134 illustrated in FIGS. 13 and 14 may be applied to the groove portions 16 to 19, respectively, or alternatively, the application of the adhesives 131 and 134 may be performed after the process of fitting the cover 60 is finished.

Regarding the first wall portions 111 to 113, the adhesive 130 is applied to only a lower-side portion of each of the wall surfaces 111a to 113a, the lower-side portion extending over the same axial range as that of the first surface 101. Therefore, the adhesive 130 is not applied to a surface of the guide projection portion 111b of the first wall portion 111 which faces radially outward, or a surface of the projection portion 112b of the first wall portion 112 which faces radially outward. Regarding the first wall portion 113, the adhesive 130 is similarly applied to only a lower-side portion thereof.

An operator of an assembling process places the cover 60 over the upper housing 25 with an opening portion of the tubular portion 62 facing downward. As illustrated in FIG. 1, the guide projection portion 111b of the first positioning portion 11 projects upward to the greatest height in an outer peripheral end portion of the upper surface of the upper housing 25. The operator brings the inner peripheral surface 62a of the tubular portion 62 of the cover 60 into contact with a portion of the wall surface 111a which is included in the guide projection portion 111b to align the cover 60 and the upper housing 25 in the x-axis direction.

At this time, since the first wall portion 111 includes the slanting portion 111c at an upper end portion of the guide projection portion 111b, if the operator places the tubular portion 62 of the cover 60 upon the upper housing 25, a lower end portion of the tubular portion 62 slides on the slanting portion 111c to guide the tubular portion 62 onto the wall surface 111a.

The operator horizontally moves the cover 60 while keeping the cover 60 in contact with the guide projection portion 111b to bring the tubular portion 62 of the cover 60 into contact with the first wall portion 112 of the second positioning portion 12 and the first wall portion 113 of the third positioning portion 13.

Note that, since the adhesive 130 is not applied to a radially outer surface of the guide projection portion 111b, even if the operator moves the cover 60 for position adjustment, neither an adhesion of the adhesive 130 to an undesirable position nor a removal of the adhesive 130 from a desirable position will occur.

The operator presses the cover 60 downward with the cover 60 being aligned at three positions, i.e., at the first positioning portion 11, the second positioning portion 12, and the third positioning portion 13. Since the first wall portion 112 includes the slanting portion 112c at an upper end portion thereof, and the first wall portion 113 includes the slanting portion 113c at an upper end portion thereof, the lower end portion of the tubular portion 62, which is in contact with the first wall portions 112 and 113, is guided onto the wall surface 112a and the wall surface 113a through the slanting portion 112c and the slanting portion 113c.

In the present example embodiment, the first wall portion 112 and the first wall portion 113 are arranged to face away from each other with the control portion 80 therebetween. A distance between the wall surface 112a and the wall surface 113a in the y-axis direction is arranged to be greater than a distance between portions of an inner peripheral surface of the cover 60 which are brought into contact with the first wall portions 112 and 113.

Thus, the cover 60 is press fitted to the cover joint portion 100 at the first wall portion 112 and the first wall portion 113. That is, the cover 60 is fixed to the cover joint portion 100 with the cover 60 pressing each of the first wall portions 112 and 113 in a radial direction. Thus, the cover 60 and the upper housing 25 can be fixed to each other without using a screw or snap fitting. This contributes to eliminating a portion projecting radially outward from the cover 60, e.g., a flange or a claw, and reducing an increase in the size of the motor 1.

Since each of the first wall portions 112 and 113, each of which is arranged to be in contact with the cover 60, is arranged to project upward relative to the first surface 101, to which the cover 60 is joined through the adhesive, the adhesive 130 is not applied to an upper-side portion of each of the first wall portions 112 and 113. Accordingly, at a time when the cover 60 has been press fitted to the upper-side portion of each of the first wall portions 112 and 113, the adhesive 130 is not adhered to the cover 60. Thus, the operator is able to position the cover 60 without a contact of the adhesive 130 with the cover 60, facilitating assembly.

The operator holds the cover 60 in a horizontal position with the cover 60 being press fitted to the upper-side portion of each of the first wall portions 112 and 113, and presses the cover further downward. The cover 60 moves while pressing the adhesive 130, which has been brought into contact with the lower surface 63a of the flange portion 63, downward, and stops when the lower surface 63a of the flange portion 63 has come into contact with upper surfaces of the second wall portions 121, 122, 143, and 153.

In the surface of the cover joint portion 100 which faces radially outward, each of the first wall portions 111 to 113, 141, and 151 projects radially outward relative to the first surface 101, and therefore, the inner peripheral surface 62a of the tubular portion 62 is brought into contact with only the first wall portions 111 to 113, 141, and 151. That is, the inner peripheral surface 62a of the tubular portion 62 and the first surface 101 are opposed to each other with a gap therebetween.

Therefore, when the cover 60 moves downward, the adhesive 130 on the first surface 101 is only partially pressed downward by the lower surface 63a of the flange portion 63, and only a portion of the adhesive 130 is adhered to the second surface 102. As a result, as illustrated in FIG. 13, the lower surface of the flange portion 63, which corresponds to the downwardly-facing end surface of the tubular portion 62, and the second surface 102 are adhered to each other through the adhesive 130. Meanwhile, the first surface 101 and the inner peripheral surface 62a of the tubular portion 62 are adhered to each other through portions of the adhesive 130 which are left on the first surface 101.

As described above, in the motor 1, the first surface 101 and the second surface 102 of the shoulder portion 10 are firmly adhered to opposed surfaces of the cover 60 through the adhesive 130. Since the two surfaces of the shoulder portion 10 are thus adhered to the cover 60, a path along which moisture or the like can intrude is relatively long, leading to satisfactory sealing performance at the cover joint portion 100.

In the present example embodiment, the cover 60 is fixed to the cover joint portion 100, which surrounds the connector 90 and the upper housing 25, and the cover joint portion 100 is sealed with the adhesive 130, and therefore, an end portion of the cover 60 can be made watertight even if a portion of the connector 90 is exposed between the arm portions 26b and 26c. That is, according to the present example embodiment, a reduction in the size of the motor can be achieved without a loss of watertightness. In addition, since the adhesive 130 is used to seal the cover joint portion 100, the gap between the tubular portion 62 and the cover joint portion 100 can be easily sealed even if the cover joint portion 100 has a complicated shape with recesses and projections.

In addition, in the present example embodiment, junctions between the control portion 80 and the connector 90 can be protected as a result of the cover 60 being adhered to the portion of the cover joint portion 100 which is included in the connector 90. When the connection terminals (not shown) of a connector of a device are inserted into the recessed portions 91a on the lower side of the connector 90, an upward force acts on the connector 90. In the present example embodiment, this upward force is received by the cover 60 through the connector body 91. This contributes to reducing a force to be exerted on junctions between the connection terminals within the connector body 91 and the control portion 80. The junctions between the connector 90 and the control portion 80 can thus be protected.

Note that the cover joint portion 100 may be sealed with the tubular portion 62 being adhered to only one of the first surface 101 and the second surface 102 through the adhesive 130 if sufficient sealing can thus be achieved.

Although a gap between the cover joint portion 100 and the cover 60 is sealed with the adhesive 130 in the present example embodiment, a watertight member other than the adhesive may alternatively be used. For example, the gap between the cover joint portion 100 and the cover 60 may alternatively be sealed using an O ring or a gasket.

In the motor 1 according to the present example embodiment, the cover 60 is positioned in the x-axis direction with respect to the upper housing 25 through the first wall portion 111 of the first positioning portion 11, the first wall portion 141 of the fourth positioning portion 14, and the first wall portion 151 of the fifth positioning portion 15. The first wall portion 111 of the first positioning portion 11 and each of the first wall portion 141 of the fourth positioning portion 14 and the first wall portion 151 of the fifth positioning portion 15 are arranged to face away from each other in the x-axis direction. Thus, the cover 60 can be positioned in the x-axis direction with increased accuracy.

Although each of the first to fifth positioning portions 11 to 15 is arranged in the upper housing 25 in the present example embodiment, the portion of the cover joint portion 100 which is included in the connector 90 may be provided with a mechanism for positioning the cover 60. For example, portions similar to the first wall portion 141, the first recessed portion 142, the second wall portion 143, and the second recessed portion 144 of the fourth positioning portion 14 may be arranged in the portion of the cover joint portion 100 which is included in the connector 90. Providing the connector 90 with such a positioning mechanism makes it possible to make the thickness of the adhesive 130 on the portion of the cover joint portion 100 which is included in the connector 90 uniform, to increase adhesion and sealing between the cover 60 and the above portion of the cover joint portion 100.

Features as described above in the present specification may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a motor body including a stator and a rotor centered on a central axis extending in a vertical direction;
   a housing to house the motor body;
   a heat sink located on an upper side of the motor body;
   a controller located on the heat sink;
   a connector connected to the controller; and
   a cover surrounding the controller and the connector from radially outside; wherein
   the heat sink includes two arm portions each extending radially outward;
   the connector is held between the two arm portions;
   the heat sink and the connector include a cover joint portion extending all a way around surfaces of the heat sink and the connector along a circumferential direction, and being in a shape of a loop, surrounding the controller, when viewed in an axial direction;
   the cover is joined to the cover joint portion;
   the connector includes a connector outside surface exposed between the two arm portions, and including circumferential end portions adjacent to the arm portions; and
   the circumferential end portions overlap with an imaginary line joining distal ends of the two arm portions or are located radially inward of the imaginary line when viewed in the axial direction.

2. The motor according to claim 1, wherein the connector outside surface exposed between the two arm portions overlaps with the imaginary line joining the distal ends of the two arm portions or be located radially inward of the imaginary line when viewed in the axial direction.

3. The motor according to claim 1, further comprising an adhesive; wherein
   the cover joint portion includes a first surface facing radially, and a second surface extending radially from a lower end of the first surface;
   the cover includes a tubular portion radially opposite to the first surface; and
   at least one of a gap between the tubular portion and the first surface and a gap between the tubular portion and the second surface is sealed with the adhesive.

4. The motor according to claim 3, wherein a portion of the cover joint portion located in each of the two arm portions includes:
   a first wall portion projecting in a radial direction relative to a portion of the first surface which is included in the connector; and
   a first recessed portion located on a lower side of the first wall portion, and recessed downward relative to a portion of the second surface which is included in the arm portion.

5. The motor according to claim 4, wherein
   each of the two arm portions includes an upper arm portion extending in a radial direction along a side surface of the connector, and a forearm portion extending from a distal end of the upper arm portion to a position radially outside of the connector; and
   the first wall portion and the first recessed portion are located in the forearm portion.

6. The motor according to claim 3, wherein a portion of the cover joint portion located in each arm portion includes:
   a second wall portion projecting upward relative to a portion of the second surface included in the arm portion; and
   a second recessed portion located radially inside of the second wall portion, and recessed radially inward relative to a portion of the first surface included in the arm portion.

7. The motor according to claim 6, wherein
   each of the two arm portions includes an upper arm portion extending in a radial direction along a side surface of the connector, and a forearm portion extending from a distal end of the upper arm portion to a position radially outside of the connector; and
   the second wall portion and the second recessed portion are located in the forearm portion.

8. The motor according to claim 3, wherein a portion of the cover joint portion located in the heat sink includes:
   a first wall portion projecting radially outward from the first surface to be in contact with an inner peripheral surface of the tubular portion;
   a first recessed portion recessed downward from the second surface on a lower side of the first wall portion;
   a second wall portion projecting upward from the second surface to be in contact with a downwardly-facing end surface of the tubular portion; and
   a second recessed portion recessed radially inward from the first surface radially inside of the second wall portion.

9. The motor according to claim 1, wherein the connector includes a recessed portion recessed radially inward in the connector outside surface exposed between the two arm portions.

10. The motor according to claim 1, wherein
    the connector includes a connector body extending in the vertical direction, and a flange portion extending from a side surface of the connector body in directions not parallel to the vertical direction;
    the flange portion is located lower than the cover joint portion; and
    an upper surface of the flange portion is in contact with a lower surface of each arm portion directly or with another member therebetween.

11. The motor according to claim 10, wherein
    the connector includes at least one projection portion projecting upward from the upper surface of the flange portion; and
    at least one of the arm portions includes a recessed portion into which one of the at least one projection portion is inserted at a lower surface of the arm portion.

12. The motor according to claim 1, wherein a surface of the connector which faces upward and a surface of the cover which faces downward are connected to each other directly or with an adhesive therebetween.

* * * * *